United States Patent
Iwuchukwu

(10) Patent No.: US 9,200,921 B2
(45) Date of Patent: Dec. 1, 2015

(54) PARKING INFORMATION BASED ON DESTINATION

(71) Applicant: Nokia Corporation, Oulu (FI)

(72) Inventor: Tochukwu Iwuchukwu, Chicago, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/798,967

(22) Filed: Mar. 13, 2013

(65) Prior Publication Data

US 2014/0278081 A1 Sep. 18, 2014

(51) Int. Cl.
*G01C 21/36* (2006.01)
*G01C 21/34* (2006.01)
*G08G 1/14* (2006.01)
*G08G 1/0969* (2006.01)

(52) U.S. Cl.
CPC ........ *G01C 21/3679* (2013.01); *G01C 21/3685* (2013.01); *G08G 1/142* (2013.01); *G01C 21/34* (2013.01); *G08G 1/0969* (2013.01)

(58) Field of Classification Search
CPC .................................................. G08G 1/14
USPC ........................................ 701/519; 340/932
See application file for complete search history.

(56) References Cited

U.S. PATENT DOCUMENTS

| | | | |
|---|---|---|---|
| 7,049,979 B2 | 5/2006 | Dunning | |
| 7,538,690 B1 | 5/2009 | Kaplan et al. | |
| 7,949,464 B2 | 5/2011 | Kaplan et al. | |
| 8,063,797 B1 | 11/2011 | Sonnabend et al. | |
| 8,589,069 B1 * | 11/2013 | Lehman | 701/438 |
| 2004/0032342 A1 | 2/2004 | Dunning | |
| 2008/0027640 A1 * | 1/2008 | Kashalkar | 701/209 |
| 2009/0187341 A1 | 7/2009 | Vavrus et al. | |
| 2010/0017118 A1 * | 1/2010 | Dougherty | 701/209 |
| 2010/0302068 A1 | 12/2010 | Bandukwala | |

(Continued)

FOREIGN PATENT DOCUMENTS

| | | | |
|---|---|---|---|
| DE | 102005027250 | 12/2006 | |
| EP | 1030167 | 8/2000 | |
| EP | 1775690 A1 * | 4/2007 | |
| EP | 1995557 | 11/2008 | |
| JP | 2001056638 | 2/2001 | |
| JP | 2008002819 A * | 1/2008 | G01C 21/00 |

OTHER PUBLICATIONS

Otake et al. JP 2008-002819 A. Translation acquired from http://dossier1.ipdl.inpit.go.jp on Dec. 24, 2013.*

(Continued)

*Primary Examiner* — Rami Khatib
*Assistant Examiner* — Jeffrey Boomer
(74) *Attorney, Agent, or Firm* — Lempia Summerfield Katz LLC

(57) ABSTRACT

In one embodiment, a mobile device includes position circuitry and routing algorithms for generating routing instructions from a current position of the mobile device to a destination. The destination is specified in a navigation request and may describe a point-of-interest. A database associates points-of-interest individually or by category with estimated parking durations. The mobile device accesses an estimated parking duration and selects a preferred parking location based on the estimated parking duration. Considerations for selecting the preferred parking location include cost, parking restrictions, and/or distance. For example, the preferred parking location may be the available parking spot that is the least expensive during the estimated parking duration and avoids no parking zones or other time constraints.

20 Claims, 9 Drawing Sheets

(56) References Cited

U.S. PATENT DOCUMENTS

2012/0062395 A1* 3/2012 Sonnabend et al. ....... 340/932.2
2012/0078504 A1* 3/2012 Zhou .............................. 701/411
2012/0098677 A1 4/2012 Geelen
2012/0135746 A1* 5/2012 Mohlig et al. ............. 455/456.1
2012/0197690 A1 8/2012 Agulnek
2012/0299749 A1* 11/2012 Xiao et al. ................. 340/932.2

OTHER PUBLICATIONS

LineKing. LineKing: Crowdsourced Line Wait Time Estimation using Smartphones. University at Buffalo. Archived by archive.org on Sep. 7, 2012.*

International Search Report and Written Opinion for PCT/FI2014/050040, mailed Apr. 30, 2014.

* cited by examiner

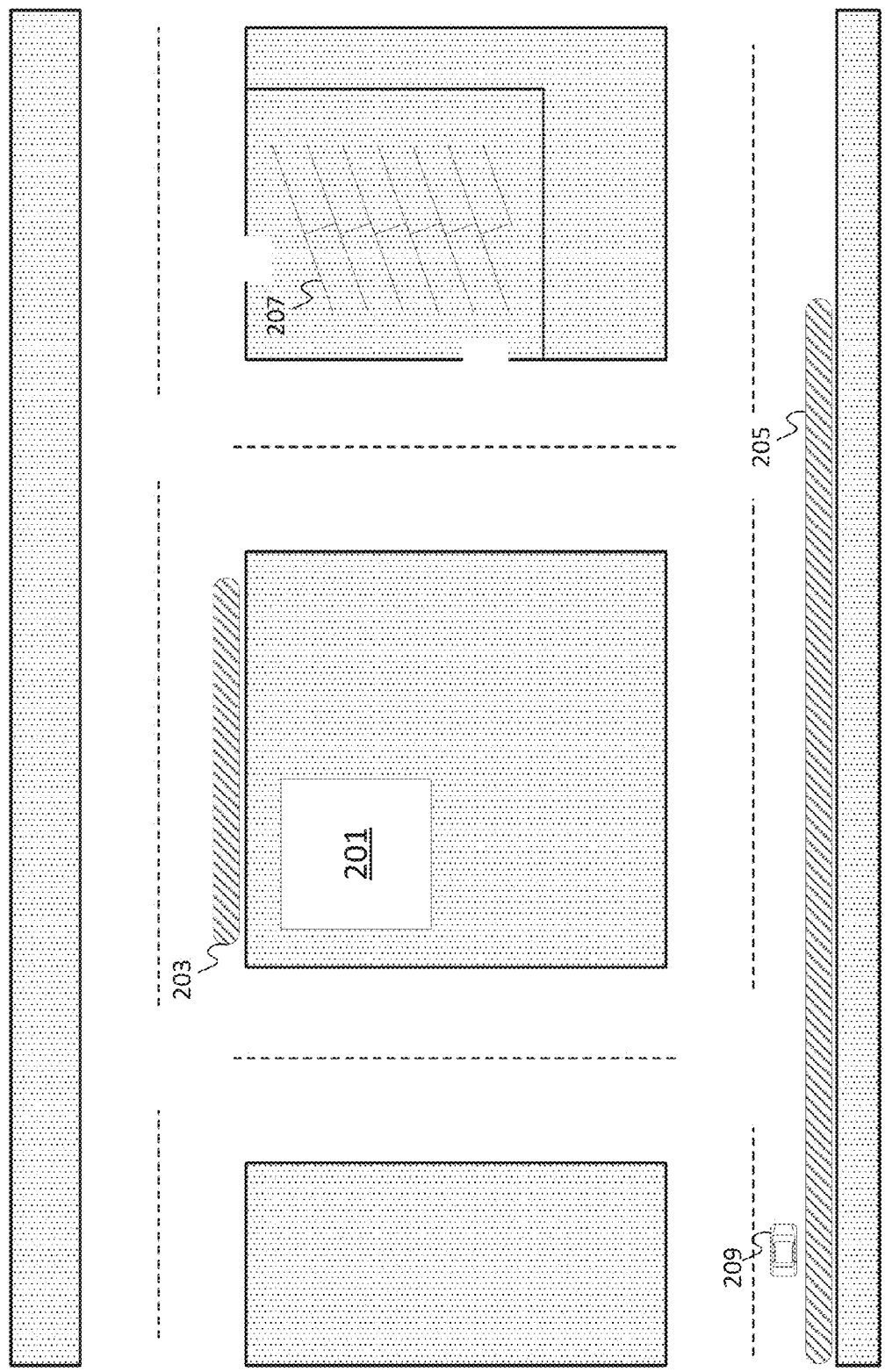

| Category | Name | Time Estimate | POI Address | POI Position | Parking Position |
|---|---|---|---|---|---|
| Bank | City Bank | 12 minutes | 1001 Main Street, Palo Alto, CA | 37.12311, 122.12345 | X1, Y1 |
| Cinema | Pacific Theatre | 147 minutes | 1002 Elm Street, Palo Alto, CA | 37.12322, 122.12345 | X2, Y2 |
| Museum | Computer History Museum | 84 minutes | 1003 Maple Street, Palo Alto, CA | 37.12333, 122.12345 | X3, Y3 |
| Restaurant | Pizza Palace | 72 minutes | 1004 State Street, Palo Alto, CA | 37.12344, 122.12345 | X4, Y4 |
| Shopping | Valley Mall | 131 minutes | 1005 New York Avenue, Palo Alto, CA | 37.12355, 122.12345 | X5, Y5 |

PARKING INFORMATION BASED ON DESTINATION

FIELD

The following disclosure relates to map and navigation related applications, and more specifically to enhancement of the provision of parking information in a map or navigation related application.

BACKGROUND

Vehicle navigation systems are available that provide end users with various navigation related functions and features. For example, some navigation systems are able to determine an optimum route to travel along a road network from an origin location to a destination location in a geographic region. Using input from the end user, and optionally from equipment that can determine the end user's location, the navigation system can examine various potential routes between the origin and destination locations to determine the optimum route. The navigation system may then provide the end user with information about the optimum route in the form of guidance that identifies the driving maneuvers to be taken by the end user to travel from the origin to the destination. The guidance may take the form of visual and/or audio instructions that are provided along the way as the end user is traveling the route. Some navigation systems are able to show detailed maps on displays outlining the route, the types of maneuvers to be taken at various locations along the route, locations of certain types of features, and so on. Although navigation systems provide many important features, there continues to be room for new features and improvements.

SUMMARY

In one embodiment, a mobile device includes position circuitry to determine a current position of the mobile device and includes routing algorithms for generating routing instructions from the current position of the mobile device to a destination. The destination is specified in a navigation request and may describe a point-of-interest. A database associates points-of-interest individually or by category with estimated parking durations. The mobile device accesses the estimated parking duration and selects a preferred parking location based on the estimated parking duration. Considerations for selecting the preferred parking location include cost, parking restrictions, and/or distance. For example, the preferred parking location may be the available parking spot that is the least expensive during the estimated parking duration and avoids no parking zones or other time constraints.

BRIEF DESCRIPTION OF THE DRAWINGS

Exemplary embodiments of the present invention are described herein with reference to the following drawings.

FIG. 2 illustrates an example road network and parking locations.

FIG. 3 illustrates an example point-of-interest lookup table.

DETAILED DESCRIPTION

The following embodiments include a system and method for selecting a parking spot or navigating to the parking spot based on a nearby destination or a point-of-interest at the nearby destination. Users of navigation related applications search for routes to points-of-interest (POIs), such as banks, restaurants, museums, movie theaters and shopping malls. One important factor in determining a suitable parking location is the time limit constraint on the parking location. Navigation related applications may present suitable parking locations to a user based on time limit constraints. For example, the parking locations may be associated with parking restrictions based on the time of day (e.g., rush hour no parking zones) or the day of the week (e.g., weekend parking only or street sweeping restrictions). The user then determines the best parking location based on the time the user expects to return to the parking location. However, the user does not always know how much time will pass before the user returns to the parking location.

The following embodiments automatically estimate when the user likely will return to the vehicle in order to select the most suitable parking location or set of suitable parking locations. The user is no longer faced with the problem of determining the best parking location for a destination. Situations may be avoided in which the user may not know or may miscalculate the expected time of return to a parking location. The estimation of when the user will likely return may be based on a feedback system that tracks time spent at point-of-interests by the user and/or other users. The estimations for future navigation requests are refined over time. In one example, the navigation system tracks the time spent by users away from parking locations or the time spent by users at specific points-of-interest or types of points-of-interest.

Figure 1:
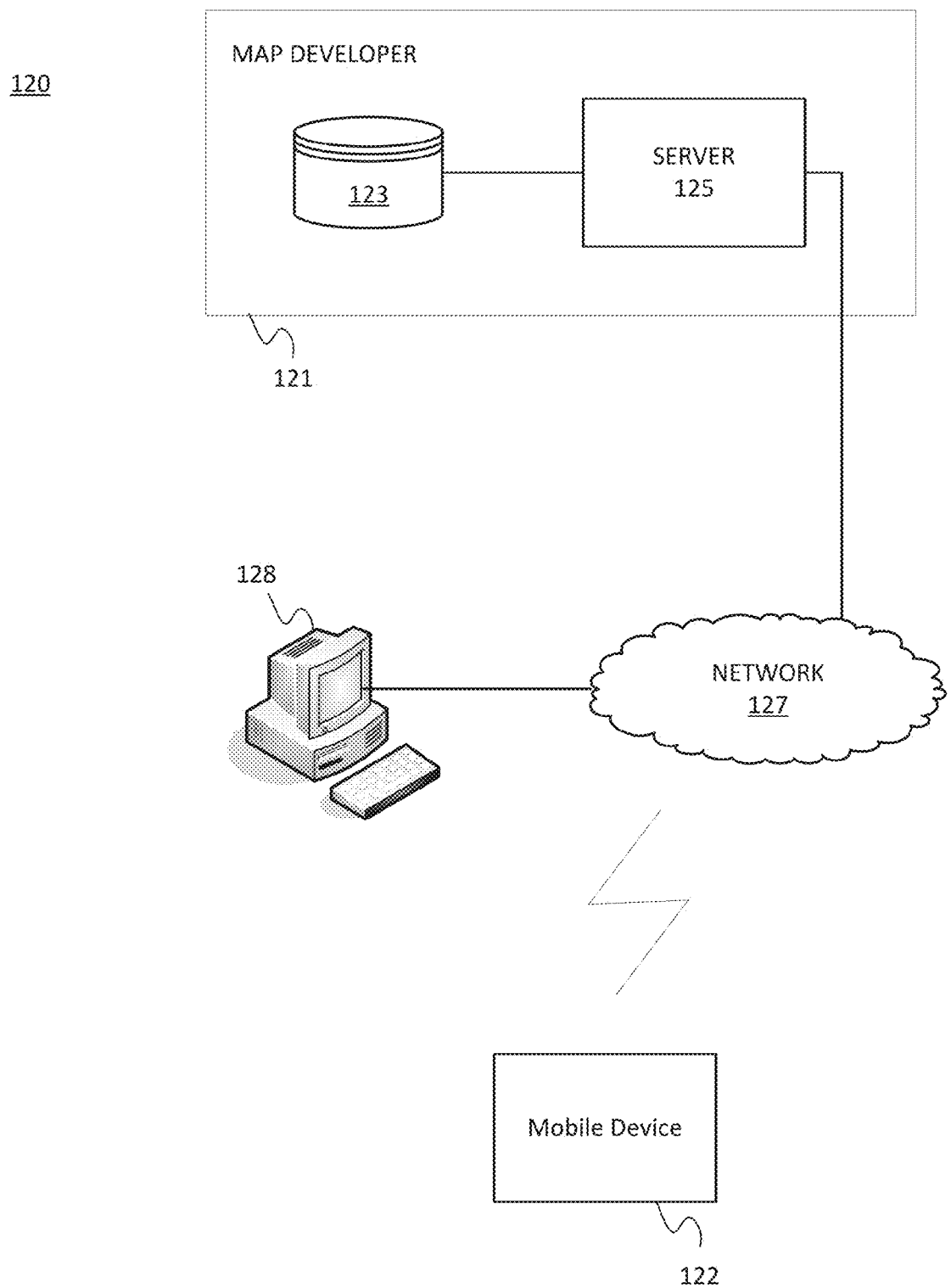
FIG. 1 illustrates an exemplary navigation system for identifying parking.

FIG. 1 illustrates an exemplary navigation system 120. The navigation system 120 includes a map developer system 121, a mobile device 122, a workstation 128, and a network 127. Additional, different, or fewer components may be provided. For example, many mobile devices 122 and/or workstations 128 may connect with the network 127.

The developer system 121 includes a server 125 and a database 123. The optional workstation 128 is a general purpose computer including programming specialized for the following embodiments. The workstation 128 includes at least a memory, a processor, and a communication interface. The developer system 121 may include computer systems and networks of a system operator such as NAVTEQ or Nokia Corporation. The geographic database 123 may be partially or completely stored in the mobile device 122.

The developer system 121, the workstation 128, and the mobile device 122 are coupled with the network 127. The phrase "coupled with" is defined to mean directly connected to or indirectly connected through one or more intermediate components. Such intermediate components may include hardware and/or software-based components.

The mobile device 122 is a smart phone, a mobile phone, a personal digital assistant ("PDA"), a tablet computer, a notebook computer, a personal navigation device ("PND"), a portable navigation device, and/or any other known or later developed mobile device.

The optional workstation 128 is a general purpose computer including programming specialized for automatic selection of parking locations as applied to map-related applications rather than navigation-related applications. The user enters a destination on the optional workstation 128, which is included in the navigation request. The workstation 128, which remains stationary, selects the preferred parking location as described above and provides directions to the preferred parking location, which may be printed or saved.

A navigation request is received for a point-of-interest at a geographic location. The navigation request may specify the name of the point-of-interest, a category of the point-of-interest, or the specific geographic location. The navigation request may be received at the mobile device 122, for example, from a user interface or input device. The navigation request may be received at the server 125 from the mobile device 122. The navigation request may be used to provide routing as described below.

In addition, routing may be provided to an automatically selected parking location. The selection of the parking location is based, at least in part, on one or more criteria defined for the point-of-interest. The criteria may include a name of the point-of-interest, a category of the point-of-interest, or a user history of the point-of-interest.

In one implementation, locations for several potential parking locations are stored in memory. Upon arrival at or near the point-of-interest, one or more parking locations are identified or selected based on the geographic location. In other words, the geographic location associated with the point-of-interest is used to narrow down the set of possible parking locations. The mobile device 122 or the server 125 compares the set of parking locations according to at least one criterion of the point-of-interest to identify a preferred parking location. The parking location may be a street location estimated between two nearby addresses to signify a stretch of street parking. The parking location may be an address or intersection indicative of a parking garage or a surface lot.

The preferred parking location is selected from the set parking locations based on the at least one criterion of the point-of-interest. The criteria may be an estimated amount time that a typical user spends at the point-of-interest. The estimated amount of time that a typical user spends at the point-of-interest may be referred to as the parking duration for the point-of-interest. The parking duration for points-of-interest may be defined based on user input or through a feedback system that records past parking durations.

A message is generated including the preferred parking location by the mobile device 122 or the server 123. The message may prompt the user with the preferred parking location and provide the option of displaying additional routing directions to the preferred parking location. The message may provide a ranked list of parking locations. The ranked list may include the parking restriction of each of the parking locations so that the user can compare parking choices.

The database 123 includes geographic data used for navigation-related applications. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may also represent points-of-interests. The points-of-interest may include gasoline stations, hotels, restaurants, museums, stadiums, offices, automobile dealerships, auto repair shops, buildings, stores, statues, monuments, or geographic landmarks. The data representing points-of-interest indicate the location of the point-of-interest, including how to access the point-of-interest using the road network (or pedestrian network), and various features or attributes of the point-of-interest, including hours of operation, telephone number, types of products and services available at the point-of-interest, address, and so on.

The geographic database 123 may also include parking locations. Each parking location may be associated in the geographic database 123 with one or more parking restrictions. The parking restrictions may include hours that the parking is legal at the parking location and/or costs associated with the parking location. Each parking location may be associated in the geographic database 123 with a parking category. Example parking categories include free street parking, metered street parking, short-term street parking, surface lot parking, garage parking, and valet parking.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122.

The computing resources for providing parking information based on destination may be divided between the server 125 and the mobile device 122. In some embodiments, the server 125 performs a majority of the processing ("server-based embodiments"). In other embodiments, the mobile device 122 or the workstation 128 performs a majority of the processing ("endpoint-based embodiments"). In addition, the processing is divided substantially evenly between the server 125 and the mobile device 122 or workstation 128 ("hybrid embodiments").

In the server-based embodiments, the server 125 is configured to receive data indicative of navigation or mapping from the mobile device 122. The server 125 queries the geographic database 123 based on a geographic location in the navigation in order to identify one or more parking locations based on the geographic location. The server 125 compares possible parking locations based on at least one criterion of the point-of-interest. The criterion may include a name of the point-of-interest, a category of the point-of-interest, or past parking data associated with the point-of-interest and recorded by the mobile device 122. The server generates a message including a selected parking location and sends the message to the mobile device 122. The mobile device 122 is configured to either display the message including the parking location or prompt the user with the option of displaying the parking location or receiving routing instructions to the parking location.

FIG. 2 illustrates an example road network and parking locations. The road network and the parking locations are stored in the database 123. In one example, the parking locations include a surface parking lot 207, a first street parking location 203 and a second street parking location 205. While other points-of-interest may be included, FIG. 2 illustrates an example point-of-interest 201. A vehicle 209 is traveling in a route toward the point-of-interest 201 and includes mobile device 122.

The mobile device 122 may select one of the parking locations as the destination of the route for the point of interest 201. The parking location may be selected on a variety of factors, such as a time of day, the relative location of the parking location, and characteristics of the point-of-interest 201. The point-of-interest 201 may be associated with an estimate parking duration. Example parking durations may include 10 minutes for coffee shops, 75 minutes for restaurants, and 90 minutes for department stores. In one example, the point-of-interest 201 is a restaurant associated with a parking duration range of 60 to 75 minutes. The first parking location 203 is the smallest distance from the point-of-interest 201. However, the second parking location 205 may be selected over the first street parking location 203 because the first parking location 203 has a parking restriction or time constraint that begins in less than the estimated parking duration of 75 minutes. The first parking location 203 may be 1 hour parking or the first parking location 203 may turn into a no parking zone at 5:00 PM, which is only 48 minutes from the current time. In another scenario, the surface parking lot 207 may be selected over both the first parking location 203 and the second parking location 205 based on a parking restriction if both street parking locations have 1 hour limits. In another example, the mobile device 122 may select the parking location based on cost for the estimated parking duration.

FIG. 3 illustrates an example point-of-interest lookup table 222. The point-of-interest lookup table 222 may be stored in database 123, which may be located at the server 125 or in the mobile device 122, in part or in whole. The point-of-interest lookup table 222 may include point-of-interest names, point-of-interest categories, parking duration estimates, point-of-interest address, point-of-interest position, and a preferred parking location. Additional, different, or fewer data may be provided in the point-of-interest lookup table 222. The parking duration estimates may be a function of time or may vary according to feedback received over time. The preferred parking location may include multiple parking locations. The multiple parking locations may be indexed by any combination of time of day, day of the week, cost, or other information. The multiple parking locations may be ranked, and the ranking may dynamically change according to the parking duration estimates.

The estimated parking durations may be stored in a rule based algorithm (e.g., point-of-interest time estimation algorithm). The point-of-interest time estimation algorithm may include if/then statements based on one or more of point-of-interest category, time of day, and day of the week. The point-of-interest time estimation algorithm may depend on the type of day (e.g., holiday, business day). The following rules are examples of one implementation of the point-of-interest time estimation.

Example point-of-interest time estimation algorithm rule 1:

```
IF Category IS "Restaurant"
  AND 12:00PM <= TimeOfDay >= 2:00PM
  AND DayOfWeek = "Monday"
  THEN 60 <= EstimatedTime >= 75
```

Example point-of-interest time estimation algorithm rule 2:

```
IF Category IS "Restaurant"
  AND 2:00PM <= TimeOfDay >= 5:00PM
  AND DayOfWeek = "Monday"
  THEN 45 <= EstimatedTime >= 60
```

Example point-of-interest time estimation algorithm rule 3:

```
IF Category IS "Bank"
  AND 9:00AM <= TimeOfDay >= 12:00PM
  AND DayOfWeek = "Monday" OR DayOfWeek = "Tuesday" OR DayOfWeek = "Wednesday" OR
    DayOfWeek = "Thursday" OR DayOfWeek = "Friday"
  THEN 10 <= EstimatedTime >= 15
```

Example point-of-interest time estimation algorithm rule 4:

```
IF Category IS "Restaurant"
  AND 12:00PM <= TimeOfDay >= 2:00PM
  AND TypeOfDay = "Holiday"
  THEN 45 <= EstimatedTime >= 60
```

Figure 4:
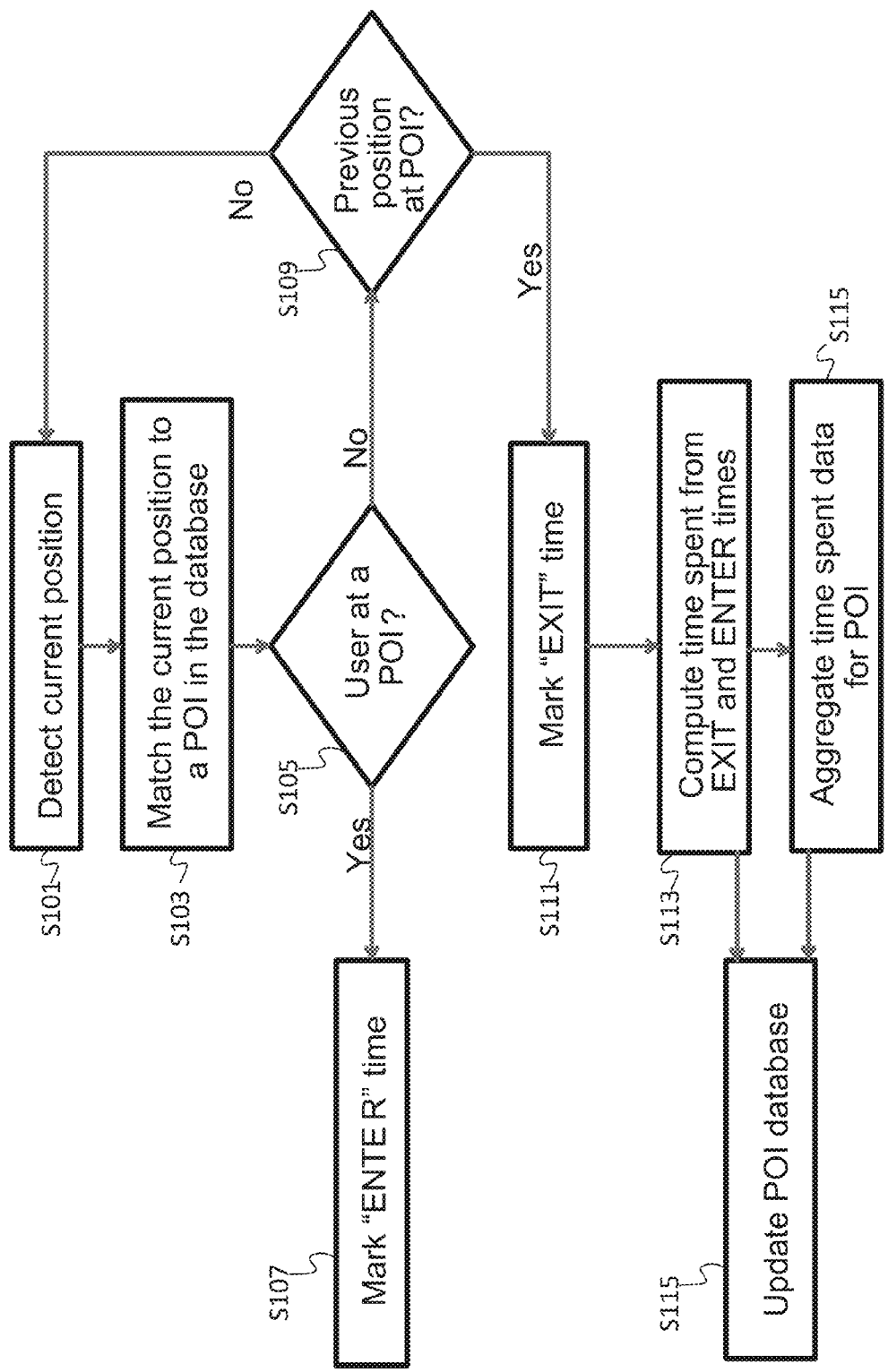
FIG. 4 illustrates an example flowchart for estimating parking durations.

FIG. 4 illustrates an example flowchart for estimating parking durations. Additional, different, or fewer acts may be provided. At act S101, the mobile device 122 detects a current position of the mobile device 122. The current position may be updated continuously or every predetermined time period. When the mobile device 122 arrives at a point-of-interest, the mobile device 122 identifies the point-of-interest as the current position and matches the current position with the point-of-interest in the point-of-interest lookup table 222, at act S103.

At act S105, the mobile device 122 determines that the user is at the point-of-interest. The mobile device 122 may determine that the user is at the point-of-interest based on the current location being at or near the point-of-interest. The mobile device 122 may determine that the user is at the point-of-interest when the current location is within a predetermined range of the point-of-interest. The mobile device 122 may determine that the user is at the point-of-interest based on a user input. For example, the mobile device 122 may display a message confirming that the user is entering the point-of-interest.

After the first instance of act S105 determines that the user is at the point-of-interest, the mobile device 122 records the enter time at act S107. Act S105 repeats until the mobile device determines that the user is no longer at the point-of-interest. At act S109, the mobile device 122 determines whether the user has returned to the previous position. If the user has not yet returned to the previous position, the process repeats acts S101-S105 until the user has returned to the previous position. The previous position may be the parking location. When the user has returned to the previous position, the mobile device records the exit time at act S111. Alternatively, act S109 may be omitted and the process may move from act S105 to act S111 when the mobile device 122 determines that the user is no longer at the point-of-interest.

At act S113, the mobile device 122 calculates an estimated time spent value at the point-of-interest by subtracting the enter time recorded at act S107 from the exit time recorded at act S111. The time spent at the point-of-interest may be recorded in the point-of-interest lookup table 222. The estimated time spent value may be based on past entry and exit times associated with a specific parking location, point-of-interest, or a category of point-of-interest.

The process may be repeated multiple times as the mobile device 122 or other mobile devices visit the point-of-interest. Multiple data entries for the time spent at the point-of-interest may be aggregated or average at act S113. Data indicative of the aggregated or average time spent at the point-of-interest may be recorded in the point-of-interest lookup table 222. The average time spent may be a range of time values. For example, the range may be a predetermined number of standard deviations (e.g., 1, 2, 3) above and below the average time spent.

In one embodiment, the process is configured to estimate time constraints or time restrictions based on user behavior. The absence of entry times or exit times for parking locations at certain times of day or certain days of the week indicates that a parking restriction may exist for that parking spot at that time. Similarly, a cluster of exit times near a specific time tends to indicate the beginning of a parking restriction, and a cluster of enter times near a specific time tends to indicate the end of a parking restriction. Alternatively, the parking restrictions are known or otherwise entered into the database without processing usage.

Figure 5:
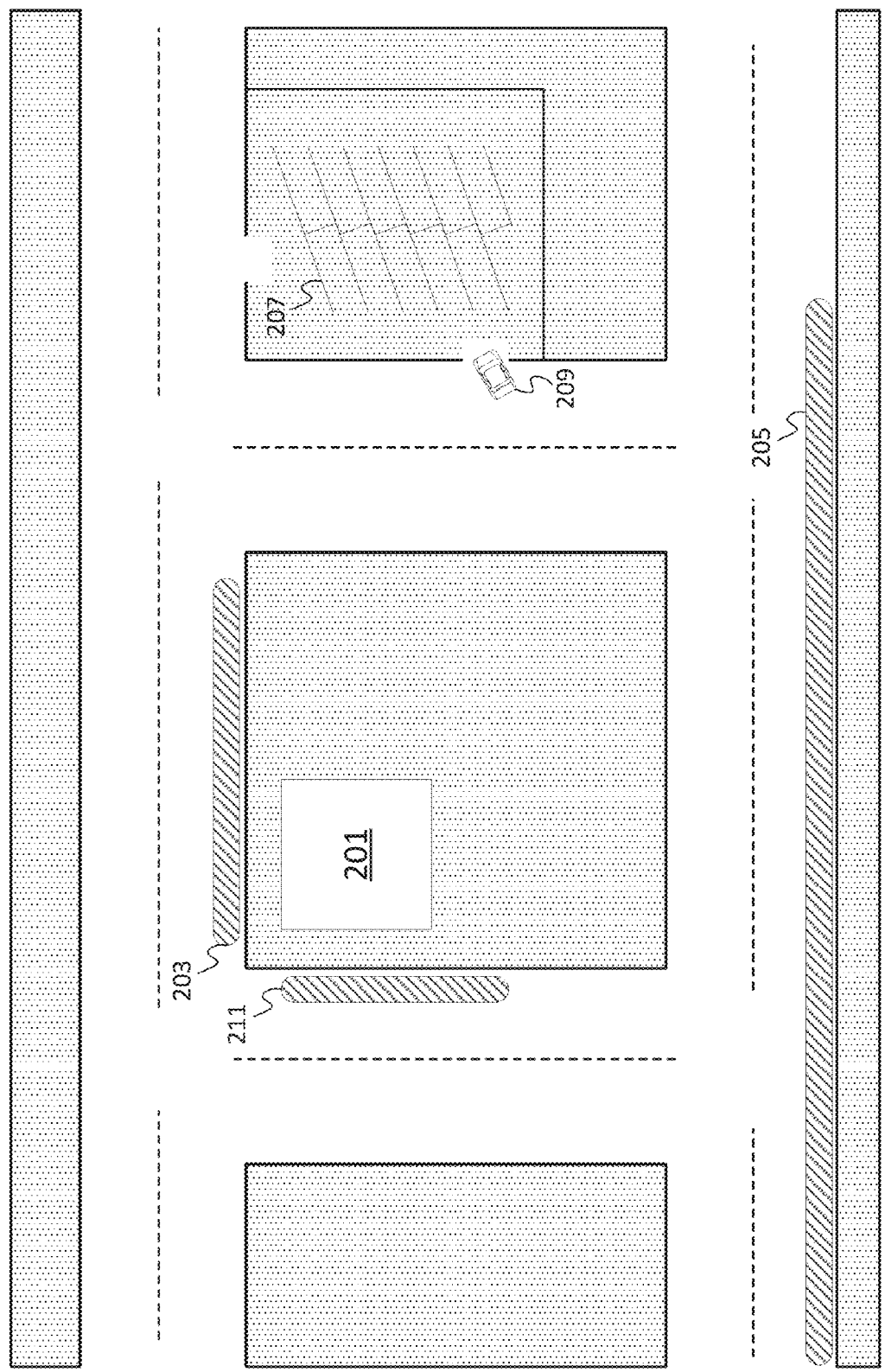
FIG. 5 illustrates another example road network and parking locations.

FIG. 5 illustrates another example road network and parking locations associated with point-of-interest 201. The point-of-interest 201 may be a hotel, with a relatively high estimated parking duration (e.g., 12 hours, 2 days, or another amount of time). The parking locations include the surface parking lot 207, the first street parking location 203, the second street parking location 205, and a third parking location 211.

The navigation application of the mobile device 122 in vehicle 209 may route the vehicle 209 to the surface parking lot 207 even though the street parking locations are closer. The determination to route the vehicle to the surface parking lot 207 is based on the high estimated parking duration in combination with parking restrictions or parking costs. The determination may be based on parking restrictions when the street parking locations become no parking zones at some point during the estimated parking duration. The determination may be based on parking costs by comparing a cost for parking during the estimated parking durations over the estimate parking duration. For example, the street parking locations may be $2.00 per hour and the surface parking lot may be $15.00 per day. Therefore, when the estimated parking duration is seven hours or less, a street parking location is lower cost but when the estimated parking duration is more than seven hours, the surface parking lot 207 is lower cost than the street parking locations. Both cost and parking restrictions may be considered is selecting a parking location.

Figure 6:
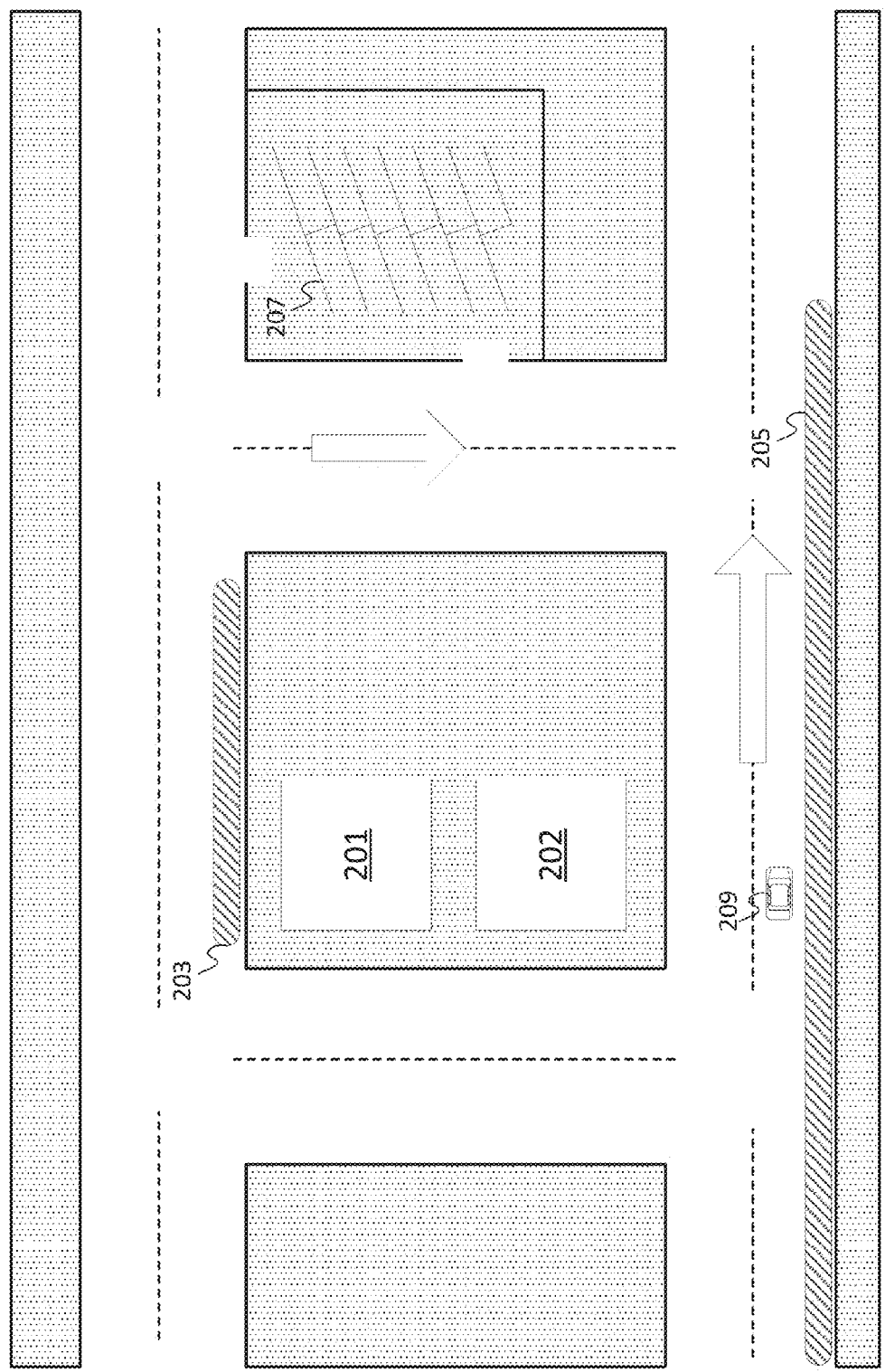
FIG. 6 illustrates yet another example road network and parking locations.

FIG. 6 illustrates another example road network and parking locations associated with point-of-interest 201 and point-of-interest 202. FIG. 6 illustrates a scenario in which the closest parking location to point-of-interest 201 is the selected parking location for point-of-interest 202 and the closest parking location to point-of-interest 202 is the selected parking location for point-of-interest 201. For example, the point-of-interest 201 may be a bank associated with an estimated parking duration of 10 to 12 minutes, and the point-of-interest 202 may be a restaurant with an estimated parking duration of 60 to 80 minutes.

The point-of-interest 202 is closest to parking location 205. However, a parking restriction will begin for parking location 205 in 30 minutes, which is less than the estimated parking duration for point-of-interest 202. Accordingly, the mobile device 122 associates the next closest parking location, which is parking location 203, with the point-of-interest 201.

The point-of-interest 201 is closest to parking location 203. However, vehicle 209 must travel several blocks because of the one way restrictions on travel on the road network. The mobile device 122 may determine that the additional driving distance to reach parking location 203 exceeds the time necessary to walk from parking location 205. Accordingly, the mobile device 122 associates parking location 205 with point-of-interest 201. Other considerations or criteria may be used for selecting parking locations.

Figure 7:
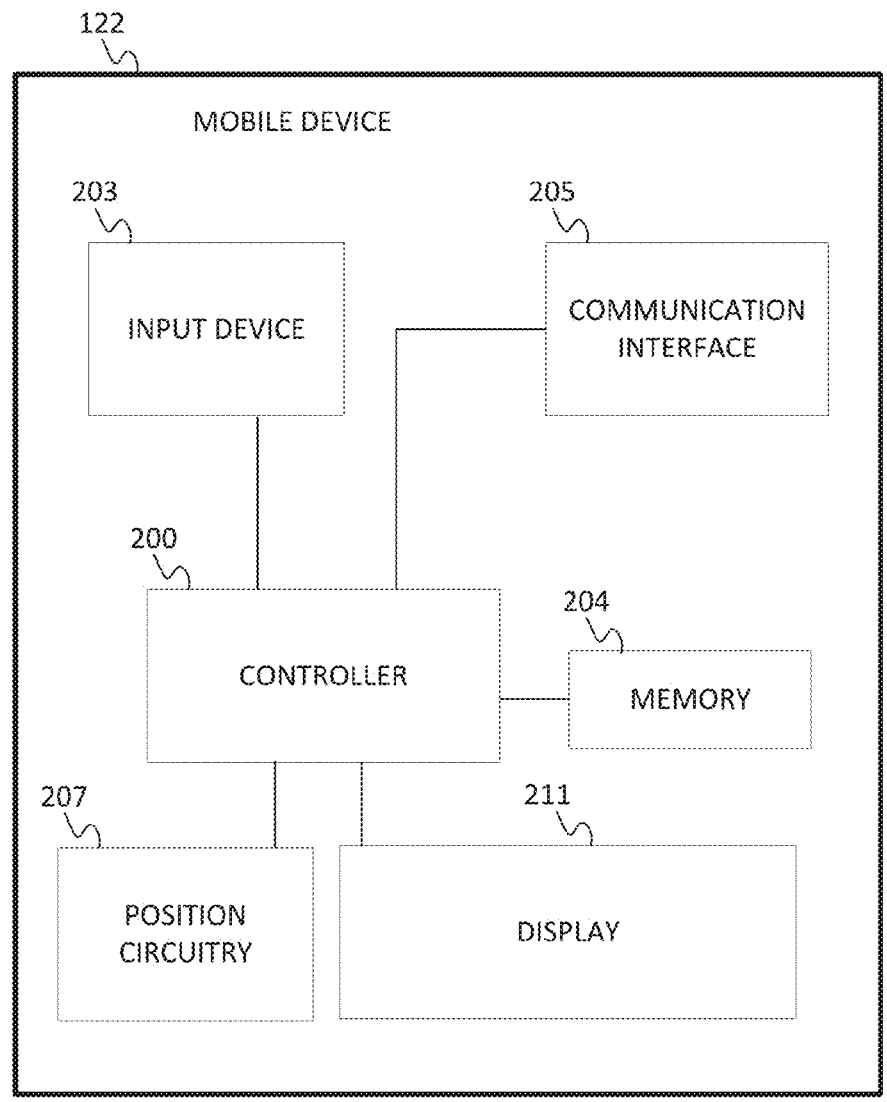
FIG. 7 illustrates an exemplary mobile device of the navigation system of FIG. 1.

FIG. 7 illustrates an exemplary mobile device 122 of the navigation system of FIG. 1. The mobile device 122 may be referred to as a navigation device. The mobile device 122 includes a controller 200, a memory 204, an input device 203, a communication interface 205, position circuitry 207, and a display 211. Additional, different, or fewer components are possible for the mobile device 122. The workstation 128 may include at least a memory and processor and may be substituted for the mobile device 122 in the following endpoint-based embodiments. In the following endpoint-based embodiments, the mobile device 122 or the workstation 128 performs a majority of the processing.

The memory 204 is configured to store estimated parking durations. The memory 204 associated estimates parking durations with points-of-interest or other geographic locations. The memory 204 may include the point-of-interest lookup table 222 illustrated in FIG. 3. Other arrangements are possible. For example, each point-of-interest may be associated with one estimated parking duration tailored to the particular user or mobile device 122 and an aggregate estimated parking duration as determined by multiple users or multiple mobile devices. One or more of the points-of-interest may be associated with a preferred parking location based on the estimated parking duration. One or more of the points-of-interest may be associated with multiple parking locations. The multiple parking locations may be ranked according to time, calendar day, or cost. The multiple parking locations may be ranked according to likelihood of availability, which may be collected as the parking duration data is collected and calculated by one or more mobile devices.

The controller 200 is configured to identify a point-of-interest from a navigation request. The navigation request may be entered by the user of the mobile device 122. The navigation request may include a point-of-interest or another geographic location. The controller 200 accesses memory 204 according to the point-of-interest or the geographic location to retrieve or select a preferred parking location from multiple parking locations stored in the memory 204. The preferred parking location may be selected based on the estimated parking duration associated with the point-of-interest. The display 211 is configured to display a message including the preferred parking location.

In one example, the preferred parking location is selected based on a name of the point-of-interest. That is, the estimated parking duration is tied to a specific location. The specific location may be a business name, a street address, or a set of geographic coordinates. The system may not include the type of point-of-interest. Instead, data is collected based on actual time users spend after they request navigation to the specific location.

In another example, the mobile device 122 or the server 125 may group types of points-of-interest. Data that is collected for the user of the mobile device 122 at all restaurants is aggregated together to determine an estimated parking duration that is used for all restaurants by that user or by users in general. Likewise, data collected while users are at shopping malls affects the estimated parking duration used for all shopping malls.

In one example, the preferred parking location includes a list of possible parking locations for the point-of-interest. The list of possible parking locations may be presented to the user along with distances, costs, and parking restrictions. The list of parking locations allows the user to manually select the preferred parking location. In addition or in the alternative, the list of parking locations may allow the mobile device 122 to provide a first parking option to the user. After traveling to the first parking option the user may discover that none of the spots at the first parking option are available and provide a command to the mobile device 122 to present a second parking option from the list of parking locations. The list of parking locations may be limited according to the estimated parking duration and presented individually according to a customized balance of distance and cost.

The mobile device 122 may be configured to select a subset of the parking locations based on distance from the current location of the mobile device 122. A threshold distance for eligible parking locations may be used. The threshold distance may be 20 meters, 50 meters, 100 meters, or another distance. The threshold distance may be configurable from a user input. The threshold distance may be adjusted such that a predetermined number (e.g., 3, 5, 10) of eligible parking locations are included within the threshold distance.

The positioning circuitry, which is an example of a positioning system, is configured to determine a geographic position of the mobile device 122. One or more of the plurality of parking locations is selected based on the geographic location of the mobile device 122. The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The input device 203 may be one or more buttons, keypad, keyboard, mouse, stylist pen, trackball, rocker switch, touch pad, voice recognition circuit, or other device or component for inputting data to the mobile device 122. The input device 203 and the display 211 may be combined as a touch screen, which may be capacitive or resistive. The display 211 may be a liquid crystal display (LCD) panel, light emitting diode (LED) screen, thin film transistor screen, or another type of display.

Figure 8:
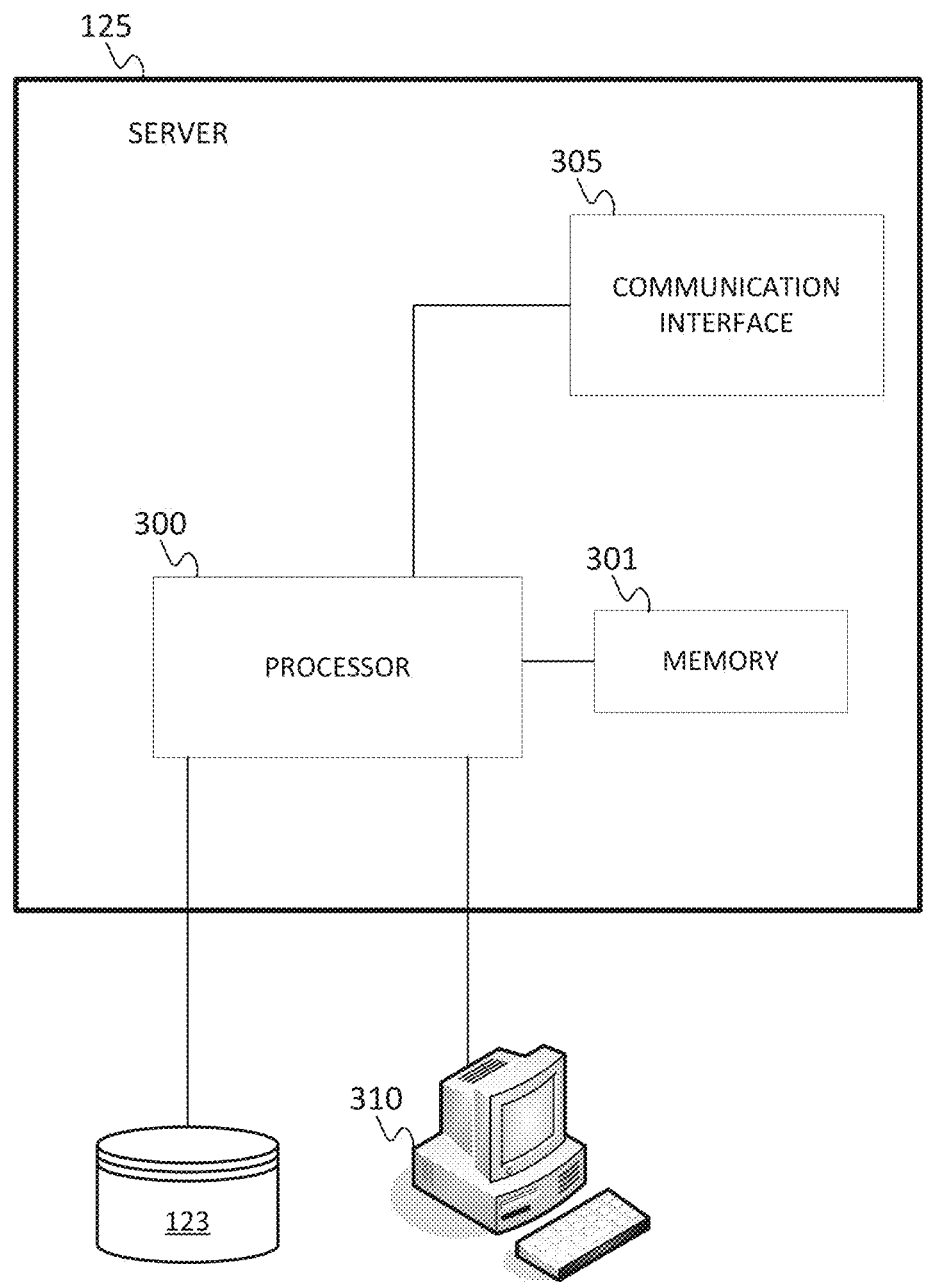
FIG. 8 illustrates an exemplary server of the navigation system of FIG. 1.

FIG. 8 illustrates an exemplary server 125 of the navigation system of FIG. 1. The server 125 includes a processor 300, a communication interface 305, and a memory 301. The server 125 may be coupled to a database 123 and a workstation 310. The database 123 may be a geographic database as discussed above. The workstation 310 may be used as an input device for the server 125. In addition, the communication interface 305 is an input device for the server 125. The communication interface 305 receives data indicative of use inputs made via the workstation 128 or the mobile device 122.

The communication interface 305 is configured to receive data indicative of a point-of-interest. The processor 300 is configured to identify parking locations within a threshold distance of the geographic location of the point-of-interest and compare the parking locations based according to an aspect of the point-of-interest, such as an estimated parking time stored in association with the point-of-interest. The processor 300 is configured to select a preferred parking location from parking locations based on the estimated parking time for the point-of-interest and generate a message including the preferred parking location. The communication interface 305 is configured to send the message to the mobile device 122.

When the mobile device 122 arrives at the preferred parking location, the communication interface 205 is configured to receive data indicative of the entry time, and when the mobile device 122 leaves the preferred parking location, the communication interface 205 is configured to receive data indicative of the exit time. The processor 300 is configured to update the estimated parking time based on a difference between the exit time and the entry time. The data for updating the estimate parking time may be received from mobile device 122 as well as other mobile devices.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

Figure 9:
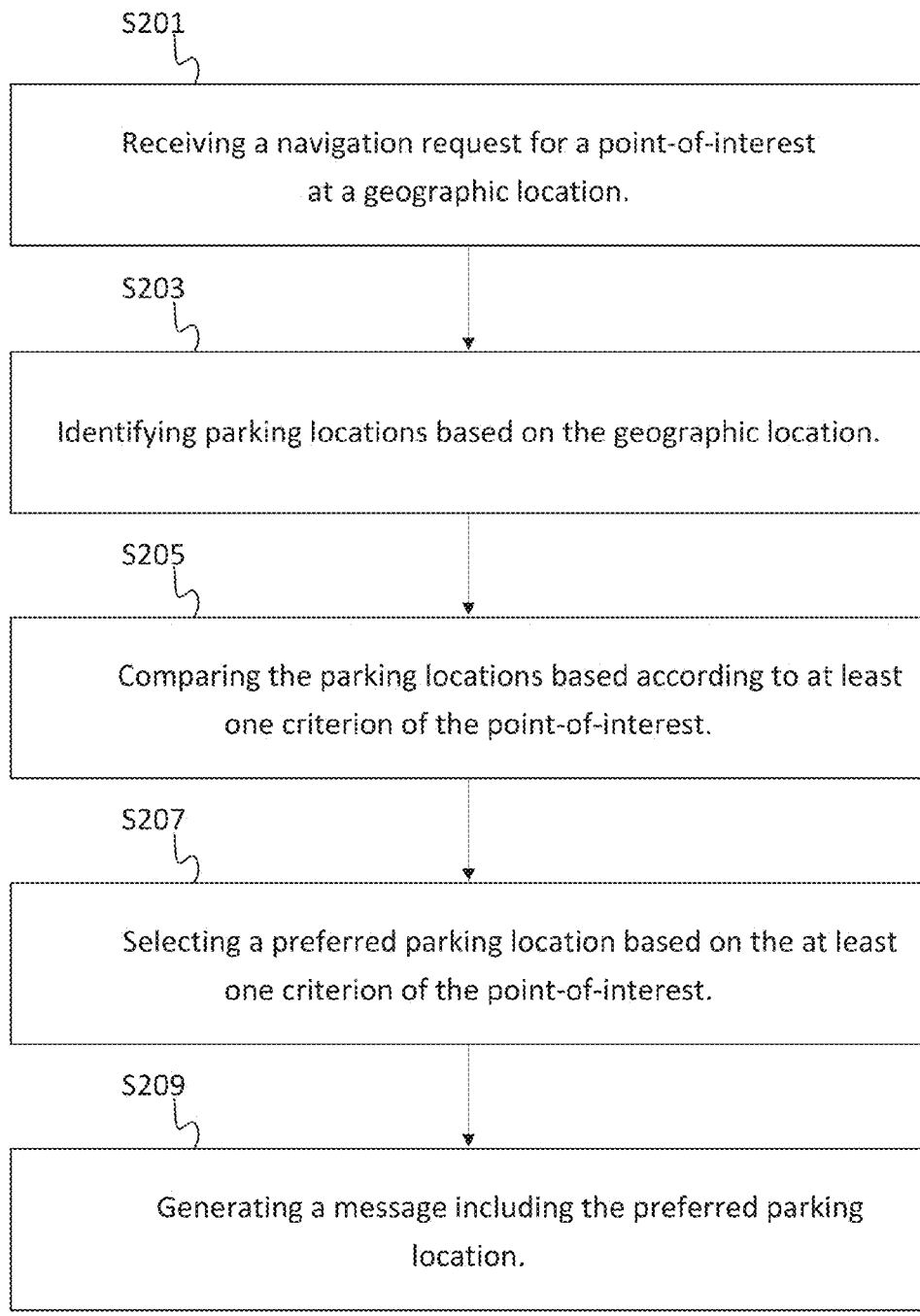
FIG. 9 illustrates an example flowchart for automatic identification of parking at a destination.

FIG. 9 illustrates an example flowchart for providing parking information based on destination. As presented in the following sections, the term controller may refer to either controller 200 or processor 300 and the following acts may be performed by mobile device 122, server 125, or a combination thereof. Additional, different, or fewer acts may be provided. The acts are performed in the order shown or other orders.

At act S201, the controller receives a navigation request. The navigation request may specify a point-of-interest at a geographic location or a set of geographic coordinates for the geographic location. At act S203, the controller identifies parking locations based on the geographic location. For example, the controller may query a geographic database to retrieve all parking locations within a predetermined distance from the geographic location.

At act S205, the controller compares the parking locations according to one or more criteria of the point-of-interest. The criteria of the point-of-interest may be stored in the geographic database or the mobile device. The values of the parameters used by the criteria are stored in the geographic database or the mobile device. The criteria of the point-of-interest may include multiple weighted terms related to possible parking locations. A first weighted term may be an estimated time spent value indicative of how much time users typically spend at the point-of-interest or similar points-of-interest. A second weighted term may a user specific value indicative of how much time the current user typically spends at points-of-interest in general or how much time the current user typically spends at similar points-of-interest. For example, the first weighted term may indicate that the parking duration for a restaurant is 70 minutes, and the second weighted term may indicate that the particular user spends less time than usual (e.g., 10% less, 20 minutes less) that the average user at restaurants. The effects of the first and second weighted terms vary according to their respective weights.

A third weighted term may be time based and indicate special circumstances when modifications of the estimated time spent value should be modified. The third weighted term may be configured to account for holidays or special events. In addition or in the alternative, the controller may be configured to contact the point-of-interest or a website associated with the point-of-interest in order to determine other factors such as wait times, which can be incorporated into the third weighted term or the estimated time spent value.

At act S207, the controller is configured to select a preferred parking location based on the one or more criteria of the point-of-interest. The controller may select the preferred parking location based on the estimated parking duration. The controller may select the preferred parking location based on the multiple weighted terms related to possible parking locations. For example, in the example above, the controller may adjust the parking duration of 70 minutes to 63 minutes to account for the idiosyncrasies of the current user. The controller may also cross reference the estimated parking durations against costs and parking restrictions of the possible parking locations.

At act S209, the controller is configured to generate a message including the preferred parking location. The message may be displayed on the mobile device 122 to the user. The user may be given the option to accept the preferred parking location as a destination in routing or ignore the preferred parking location.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving, via a server from a mobile device, a navigation request for a point-of-interest at a geographic location;
   identifying, via the server, a plurality of parking locations based on the geographic location;
   comparing, via the server, costs of the plurality of parking locations or availability for the plurality of parking locations according to a type of the point-of-interest and an estimated time spent value for the point-of-interest, wherein the estimated time spent value is based on past entry and exit times associated with the plurality of parking locations stored in a memory associated with the server;
   selecting, via the server, a preferred parking location from the plurality of parking locations based on the type of the point-of-interest; and
   generating, via the server, a message including the preferred parking location.

2. The method of claim 1, wherein the type of the point-of-interest includes a category of the point-of-interest.

3. The method of claim 1, wherein the type of the point-of-interest is associated with a parking time constraint for at least one of the plurality of parking locations and a distance from each of the plurality of parking locations to the geographic location.

4. The method of claim 1, further comprising:
   sending, via the server, the message including the preferred parking location to the mobile device.

5. The method of claim 1, further comprising:
   displaying, via a display on the mobile device, the message including the preferred.

6. The method of claim 1, wherein the type of the point-of-interest includes:
   a first weight for an estimated time spent value for the point-of-interest; and
   a second weight specific to a user for an estimated time spent value the user spends at the point-of-interest.

7. The method of claim 6 wherein the type of the point-of-interest includes:
   a third weight for holidays, special events or wait times at the point of interest.

8. The method of claim 1, wherein the estimated time spent value is based on past entry and exit times associated with the preferred parking location stored in the memory associated with the server.

9. The method of claim 1, wherein the message includes a ranked list of parking locations.

10. The method of claim 1, wherein the estimated time spent value is based on a rule based algorithm; and
    the rule based algorithm includes statements based on one or more of point-of-interest category, time of day, and day of the week.

11. The method of claim 1, wherein the server is configured to estimate time constraints or time restrictions based on clustering.

12. The method of claim 1, wherein the message includes one or more parking restrictions associated with the preferred parking location.

13. A mobile apparatus comprising:
    a memory configured to store estimated parking durations received from a server;
    a controller coupled to the memory configured to identify a point-of-interest from a navigation request and to compare the costs of a plurality of parking locations or availability for the plurality of parking locations according to a type of the point-of-interest and an estimated time spent value for the point-of-interest, wherein the estimated time spent value is based on past entry and exit times associated with the plurality of parking locations; and
    a communication interface coupled to the controller and configured to receive the past entry times and exit times associated with the plurality of parking locations from the server,
    wherein the controller is configured to select a preferred parking location based on a comparison of costs for the plurality of parking locations according to the type of the point-of-interest.

14. The mobile apparatus of claim 13, further comprising:
    a display coupled to the controller and configured to display a message including the preferred parking location.

15. The mobile apparatus of claim 14, wherein the memory includes a lookup table that associates names of points-of-interest with estimated parking durations.

16. The mobile apparatus of claim 14, wherein the memory includes a lookup table that associates categories of points-of-interest with estimated parking durations.

17. The mobile apparatus of claim 14, wherein the controller is configured to identify the plurality of parking locations based on a threshold distance from a geographic location of the mobile apparatus.

18. The mobile apparatus of claim 13, further comprising:
position circuitry in the apparatus configured to determine a geographic location of the mobile apparatus, wherein the plurality of parking locations is selected based on the geographic location.

19. A non-transitory computer readable medium including instructions that when executed are operable to:
receive, via a memory in a server, data indicative of a point-of-interest;
receive, via the memory in the server, identification of a plurality of parking locations within a threshold distance of a geographic location;
perform, via a processor in the server, a comparison of costs of the plurality of parking locations or availability of the plurality of parking locations based on a type of the point-of-interest and an estimated parking duration associated with the point-of-interest;
select, via the processor in the server, a preferred parking location from the plurality of parking locations based on the type of the point-of-interest and the comparison of costs or availability; and
generate, via the processor in the server, a message including the preferred parking location,
wherein the estimated parking duration is calculated based on past parking times for the point-of-interest stored via the memory in the server.

20. The non-transitory computer readable medium of claim 19, the instructions operable to:
monitor, via a positioning system in a navigation device, a current position of the navigation device;
record, via the memory in the server, an entry time when the current position of the navigation device arrives at the preferred parking location;
record, via the memory in the server, an exit time when the current position of the navigation device leaves the preferred parking location; and
update, via the memory in the server, the estimated parking duration based on a difference between the exit time and the entry time.

* * * * *